Figure 1:
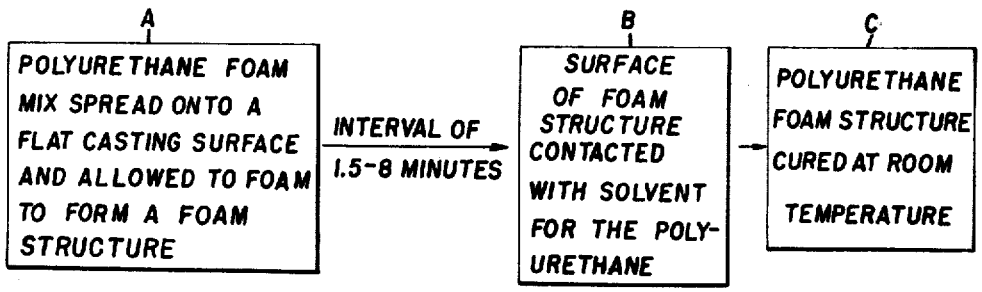

March 1, 1960  W. D. GARLINGTON  2,926,389
PROCESS FOR MODIFYING FOAM STRUCTURES
Filed March 4, 1958

INVENTOR
WILLIAM DRAKE GARLINGTON

BY

ATTORNEY

United States Patent Office

2,926,389
Patented Mar. 1, 1960

2,926,389

PROCESS FOR MODIFYING FOAM STRUCTURES

William Drake Garlington, Wilmington, Del., assignor to E. I. du Pont de Nemours and Company, Wilmington, Del., a corporation of Delaware Application March 4, 1958, Serial No. 719,068

5 Claims. (Cl. 18—48)

This invention relates to foam structures and more particularly to a process for the prevention of skin formation on the surface of polyurethane foam structures and to the resulting foam structures.

Polyurethane foams are produced by allowing fluid polyurethane foam reactants to react and foam. The foam sets up permanently, either spontaneously or by the immediate application of heat, and cures to a final state upon standing at room temperature. However, the resulting foam has a surface skin which must be removed before the foam, generally, has any practical utility. Although the quantity of waste which is produced by the trimming of the surface skin is relatively small, it is, nevertheless, not negligible.

An object of this invention, therefore, is to provide for the prevention of skin formation in the production of polyurethane foam structures. Another object is to provide a polyurethane foam structure having a non-brittle, abrasive surface suitable for scouring purposes. The foregoing and related objects will more clearly appear hereinafter.

These objects are realized by the present invention which, briefly stated, comprises in a process for producing polyurethane foam structures wherein a polyurethane product containing a plurality of free isocyanate groups and water are reacted and allowed to form a foam (porous) structure, and said foam structure is thereafter cured, the improvement which comprises applying to a surface of said structure within the time range of from 1.5 to 8.0 minutes after completion of foaming and before curing, from 18 to 34 grams per square meter of said surface of a liquid organic solvent for the uncured foam structure, and thereafter curing said foam structure whereby to produce a foam structure free of surface skin over the treated surface and having a non-brittle, porous surface layer having enlarged pores, the pore walls of which have a mean thickness of from 1.5–20 times greater than the mean thickness of the interior pore walls of said foam structure.

The preparation of cellular plastic products (herein termed "polyurethane foams") from a liquid foam-forming mixture of water and free isocyanate radical-containing polyurethane products resulting from the reaction between (1) an alkyd or other active hydrogen-containing organic polymeric material and (2) organic compounds containing, as the sole reacting groups, a plurality of isocyanate groups is described in "German Plastics Practice" by De Bell et al., 1946, pp. 316 and 463–465. Other disclosures of reactants and methods which may be employed to produce polyurethane foams applicable to this invention are United States Patents Nos. 2,282,827 (Rothrock), 2,284,637 (Catlin), 2,284,896 (Hanford et al.), 2,292,443 (Hanford), 2,333,639 (Christ et al.), 2,358,475 (Pratt et al.), 2,374,163 (Rothrock), 2,787,601 (Detrick et al.) and 2,788,335 (Barthel); and United States patent applications Serial Nos. 381,745 (Mitchell) filed September 21, 1953, 383,370 (Barthel) filed September 30, 1953, 395,843 (Roussel) filed December 2, 1953, and 405,036 (Mitchell) filed January 19, 1954, now Patent Nos. 2,850,464, 2,833,730, 2,852,506, and 2,814,600 respectively. The foam sets up permanently, either spontaneously or by the immediate application of heat, and cures to a final state through a period of standing at room temperature.

As an organic compound containing, as the sole reacting groups a plurality of isocyanate groups, there may be used, in the preparation of the polyurethane product, any of the poly —NCX compounds, X being oxygen or sulfur, i.e., any polyisocyanate. The preferred compounds are those having two groups of the formula —NCX and of these, the aryl diisocyanates in general are more useful in the practice of the present invention and form a preferred class because of their ease of preparation, low cost, reactivity, etc. Examples of this class are: 2,4-toluene diisocyanate, 2,6-toluene diisocyanate, m-phenylene diisocyanate, 4-chloro-1,3-phenylene diisocyanate, 1-chloro-phenylene 2,4-toluene diisocyanate, and naphthalene 1,5-diisocyanate.

Active hydrogen-containing polymeric organic substances suitable for use in the preparation of polyurethane products may be selected from a wide variety of polyfunctional compounds, including polyamines, polyalcohols, amino-alcohols, polyhydroxy esters, polyhydroxy ethers, polyamides, polythiols, polysulfonamides and various mixtures of these types. Other long-chain polyhydroxy and polycarboxy compounds useful in this invention are alkyd resins containing terminal hydroxyl and carboxy groups. Examples of the alkyd resin reactants are: glycols, glycerine, trimethylol propane, reacted with dibasic acids such as adipic, phthalic, succinic, maleic and carbonic.

The term "active hydrogen" is used herein to define hydrogen which reacts with isocyanates as "active hydrogen atoms" which display activity according to the Zerewitinoff test as described by Kohler in Journal of American Chemical Society, 49, 3181 (1927).

A tertiary amine catalyst is preferably used during the formation of the plastic foam to accelerate the reaction between the isocyanate and the water or other active hydrogen-containing compounds. The catalyst may be omitted and a longer time for curing may be used, or the reaction may be speeded up by the use of elevated temperatures. However, it is much simpler and more practical to add the tertiary amine catalyst to cause the reaction to take place rapidly and permit the final curing at room temperature. The more basic amines appear to be the most effective as catalysts, and those of relatively low volatility are preferred so that they will not escape to any objectionable degree during the reaction and so they will not impart to the product an objectionable odor. The following tertiary amines are illustrative of those useful as catalyst in this reaction: triethylamine, diethylcyclohexylamine, dimethylhexadecylamine, triethanolamine, pyridine, quinoline, 3-methylisoquinoline, N-methyl morpholine and N-ethyl morpholine. The amount of catalyst may range from essentially none at all to several times by weight the amount of water used.

Formation of polyurethane foam can be varied in known manner within wide limits by suitable selection of reactive components, so as to vary the degree of hardness or elasticity. Catalysts or emulsifiers may be added to control the rate of foaming in the cell structure of the foam. Catalysts may also be suitably chosen to control the length of time available for treatment, that is, by a suitable choice of catalyst (in kind and in amount) the rate of reaction may be regulated to control the length of time during which the foam surface remains "tender" or uncured.

The foaming reaction intially is rather fast with the more reactive constituents and functional groups reacting first. During the initial reactions, $CO_2$ is evolved and some polymerization and chain extension takes place. The cellular structure of the foam is determined during this period. After this initial reaction, further chain extension and polymerization takes place between the less reactive groups. This latter reaction can be accelerated by using the more basic amine catalysts or by the application of heat. It is during a portion of this latter reaction that the foam is in what is termed a "tender" or uncured state. The foam is tender, or uncured, in that polymerization and chain extension are not complete. During this time, the foam is in a tacky condition and a permanent deformation would result from the application of slight pressure.

Any liquid organic solvent capable of dissolving the uncured polyurethane foam is applicable for purposes of the present invention. As representative solvents for polyurethane foams, there may be mentioned ketones, such as acetone, methylethyl ketone, diethyl ketone; ring compounds, such as benzene, toluene, xylene; ethers, such as ethylene glycol monoethyl ether, diethyl ether, methyl n-butyl ether; chlorinated hydrocarbons, such as trichloroethylene, chloroform, carbon tetrachloride; amines, such as diethyl ethanolamine, diethyl amine, n-methyl morpholine; alcohols, such as ethyl alcohol, isobutyl alcohol, normal butyl alcohol; also carboxylic acids, such as glacial acetic acid, propionic acid; and esters, such as ethyl acetate, methyl acetate, n-butyl acetate; and, in addition, compounds such as acrylonitrile and tetrahydrofuran.

The degree of treatment or surface modification of the foam can be regulated by the concentration, time and temperature of the treatment. Furthermore, the limits of concentration, time and the temperature to effect the desired abrasiveness and average pore diameter will depend upon the specific type of polyurethane foam employed. It was found, however, that if the solvent is used in quantities less than 18 grams per square meter of surface area, some surface modification results, but not the extent necessary for the present invention. If more than 34 grams per square meter is used, maximum effect is obtained but the excess solvent is wasted.

Application of the solvent may be accomplished by any of the well-known means, such as spray, dip, rotogravure, doctor rolls, doctor knife, etc. It is preferable, however, to spray a fine mist of the solvent, e.g., acetone, onto the surfaces of the polyurethane foam in sufficient quantity, readily determined by one skilled in the chemical arts, to cause some of the surface lamellae to recede into the underlying foam thus creating a surface layer having pores of greater diameter than that of the interior foam pores. The surface layer thus formed has highly abrasive characteristics.

In the accompanying drawing Fig. 1 is a flow sheet illustrative of the process of this invention. Block A designates the initial step of spreading a polyurethane foam mix prepared as herein described over a flat casting surface and allowing the mix to foam to form a foam structure. Block B designates the step of treating the surface of the foam structure with a solvent within a time interval of from 1.5 to 8 minutes after foaming ceases; and block C designates the step of curing the treated foam structure at room temperature.

Figure 2:
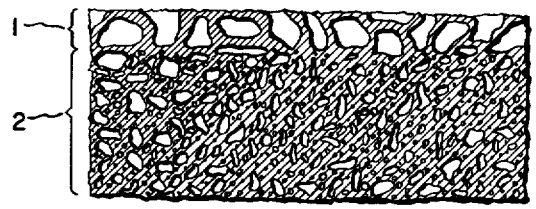

Fig. 2 of the drawing is a cross-sectional view of a block of conventional polyurethane foam, the upper surface of which, designated by the reference numeral 1, has been modified by the process of this invention to yield a porous configuration of enlarged pores, the pore walls of which have a mean thickness within the range of from 1.5 to 20 times the mean thickness of the pore walls (interior pores) in the body 2 of the foam structure.

The following examples of specific preferred embodiments will serve to further illustrate the principles and practice of this invention.

Example 1

8.6 cc. of a mixture consisting of toluene diisocyanate containing 80% toluene 2,4-diisocyanate and 20% toluene 2,6-diisocyanate was, over a period of 10 seconds, stirred into a mixture consisting of:

| | |
|---|---|
| Polyester resin [1] _____grams__ | 35 |
| Polyoxyethylated vegetable oil (emulsifier) __drops__ | 19 |
| Water _____cc__ | 2.0 |
| N-methyl morpholine _____cc__ | 0.4 |

[1] Polyester resin—reaction product of diethylene glycol, adipic acid and trimethylol propane in a 13/13/1 molar ratio having the following properties:

| | |
|---|---|
| Viscosity, centipoises | 16,000 |
| Acid No. | 2.02 |
| Specific gravity | 1.194 |
| Percent water | 0.17 |
| Solids, percent | 100 |
| Hydroxyl No. | 66.8 | to form a polyurethane foam mix. As quickly as possible the foam mix was poured onto a flat casting surface and allowed to foam. After an interval of 5 to 5.5 minutes, a fine mist of acetone was sprayed at the rate of 24.2 grams per square meter onto the exposed surface to cause the lamellae to recede into the underlying foam. The foam was cured by standing at room temperature for a prolonged period (about 16 hours). The surface layer had enlarged pores, the walls of which varied from 1.5 to 20 times greater than the thickness of the lamellae (pore walls) of the underlying foam.

A comparison of the relative abrasiveness of treated and untreated foam was determined by recording the number of strokes necessary to remove dried Carter's rubber cement from a surface. The treated foam required an average of 15 strokes, whereas untreated foams required an average of 23 strokes.

The same relative comparison was obtained in each of the following examples.

Example 2

A polyurethane foam was produced as in Example 1. 2.5–3 minutes after the completion of the foaming, a fine mist of butyl alcohol at the rate of 19.7 grams per square meter was sprayed on the exposed surfaces to cause the lamellae to recede into the underlying foam, and the foam was cured at room temperature for about 16 hours. The resulting foam structure had a non-brittle porous surface the pore walls of which averaged 1.5–20 times greater in thickness than the walls of the underlying foam pores.

Example 3

A polyurethane foam was produced in a similar manner as in Example 1. 1.5–6 minutes after the completion of the foaming, a fine mist of benzene at the rate of 33.5 grams per square meter was sprayed on the exposed foam surfaces. After curing at room temperature the foam was comparable to the foams in Examples 1 and 2.

Example 4

A polyurethane foam was produced in a similar manner as in Example 1. 2.0–2.5 minutes after the completion of the foaming a fine mist of ethylene glycol monoethyl ether at the rate of 20.4 grams per square meter was sprayed on the exposed foam surfaces. After curing at room temperature the foam was comparable to the foams in Examples 1, 2 and 3.

Example 5

8.6 cc. of a mixture consistin of toluene diisocyanate containing 80% toluene, 2,4-diisocyanate and 20% toluene 2,6-diisocyanate was stirred, over a period of 10 seconds, into a mixture consisting of:

| | |
|---|---|
| Polyester resin (of Example 1) _____grams__ | 35 |
| Polyoxyethylated vegetable oil (emulsifier) _drops__ | 19 |
| 40% urea in water solution _____cc__ | 2.0 | to form a polyurethane foam mix. As quickly as possible, the foam mix was poured onto a flat casting surface and allowed to foam. The exposed foam surfaces were sprayed with a fine mist of acrylonitrile at the rate of 29.7 grams per square meter to cause the lamellae to recede into the underlying foam. The spray was found to be effective to prevent skin formation and to produce enlarged surface pores between 1.5 to 7 minutes after the completion of the foaming.

Example 6

A polyurethane foam was produced as in Example 5, except that 4 cc. of 20% urea-water solution was used. The resulting foam was sprayed with a fine mist of ethyl acetate at the rate of 22 grams per square meter to cause the lamellae to recede into the underlying foam. The spray was found to be effective between 1.5 to 8 minutes after foaming. After curing at room temperature the foam was found to be comparable to the foams in the previous examples.

Example 7

A polyurethane foam was produced as follows: 300 grams of polyether block copolymer containing 90% propylene oxide with 10% polyethylene oxide (molecular weight approximately 2000) and 27.3 grams of toluene diisocyanates were heated together at 120° C. with stirring under a nitrogen blanket for two hours. An additional 64.2 grams of toluene diisocyanate were slowly added at 120° C. during 30 minutes. The reaction mixture was then quickly cooled to 30° C. This prepolymer was used to form a foam by the following procedure:

| | G. |
|---|---|
| Prepolymer | 50 |
| Polyoxyethylated vegetable oil (emulsifier) | 0.5 |
| N-methyl morpholine | 0.5 |
| Water | 0.5 | were rapidly and thoroughly mixed, then poured in a mold to foam. Within 2.5–3.5 minutes after the foam had raised to its maximum height, it was sprayed with a fine mist of glacial acetic acid at the rate of 22 grams per square meter. No surface skin formed, and the surface lamellae receded into the underlying foam. After curing at room temperature, the foam was characterized by increased abrasiveness with enlarged surface pores having walls ranging from 1.5–20 times greater in thickness than the interior pores.

The process of the present invention results in certain beneficial effects in addition to the primary effect of preventing the formation of a surface skin on the polyurethane foam. For example, the process modifies the surface layer of the foam by increasing the pore diameter to produce a foam having a varying density and hardness.

The process of this invention also produces a surface layer having a non-brittle, abrasive surface, thus rendering the foam useful for cleansing and scouring operations which previously could only be done by prior art means such as pumice, steel wool, alkali reactive powders, etc. This is a particular advantage of cleaning household kitchenware as well as highly polished surfaces which are liable to damage easily (e.g., lacquered coatings).

I claim:

1. In the process for forming polyurethane foam structures wherein a polyurethane product containing a plurality of free isocyanate groups is reacted with water with resultant foaming and the formation of a foam structure, and said structure is thereafter cured, the improvement which comprises applying to a surface of said structure within the time range of from 1.5–8 minutes after completion of foaming and before curing, from 18 to 34 grams per square meter of said surface of a liquid organic solvent for the uncured foam structure whereby to prevent formation of a skin over said surface and to produce a porous surface the pores of which are enlarged and have walls having a mean thickness from 1.5–20 times the mean thickness of the walls of the interior pores of said foam structure.

2. The process of claim 1 wherein the organic solvent is acetone.

3. In the process for forming polyurethane foam structures wherein a polyurethane product containing a plurality of free isocyanate groups is reacted with water with resultant foaming and the formation of a foam structure, and said structure is thereafter cured, the improvement which comprises spraying a surface of said structure within the time range of from 1.5–8 minutes after completion of foaming and before curing, with a fine mist of a liquid organic solvent for the uncured foam structure at the rate of from 18–34 grams of said solvent per square meter of said surface whereby to prevent formation of a skin over said surface and to produce a porous surface the pores of which are enlarged and have walls having a mean thickness from 1.5–20 times the mean thickness of the walls of the interior pores of said foam structure.

4. The process of claim 3 wherein the organic solvent is acetone.

5. A cured polyurethane foam structure characterized by a porous surface having enlarged pores, the mean thickness of the pore walls of the pores of said surface being from 1.5–20 times the mean thickness of the pore walls of the interior pores of said foam structure.

References Cited in the file of this patent

UNITED STATES PATENTS

| 2,327,001 | Schott | Aug. 17, 1943 |
| 2,726,219 | Hill | Dec. 6, 1955 |

FOREIGN PATENTS

| 755,787 | Great Britain | Aug. 29, 1956 |

UNITED STATES PATENT OFFICE
CERTIFICATE OF CORRECTION

Patent No. 2,926,389                              March 1, 1960

William Drake Garlington

It is hereby certified that error appears in the printed specification of the above numbered patent requiring correction and that the said Letters Patent should read as corrected below.

Column 2, line 2, for the patent number "2,852,506" read -- 2,842,506 --.

Signed and sealed this 16th day of August 1960.

(SEAL)
Attest:
KARL H. AXLINE
Attesting Officer

ROBERT C. WATSON
Commissioner of Patents